Figure 1:
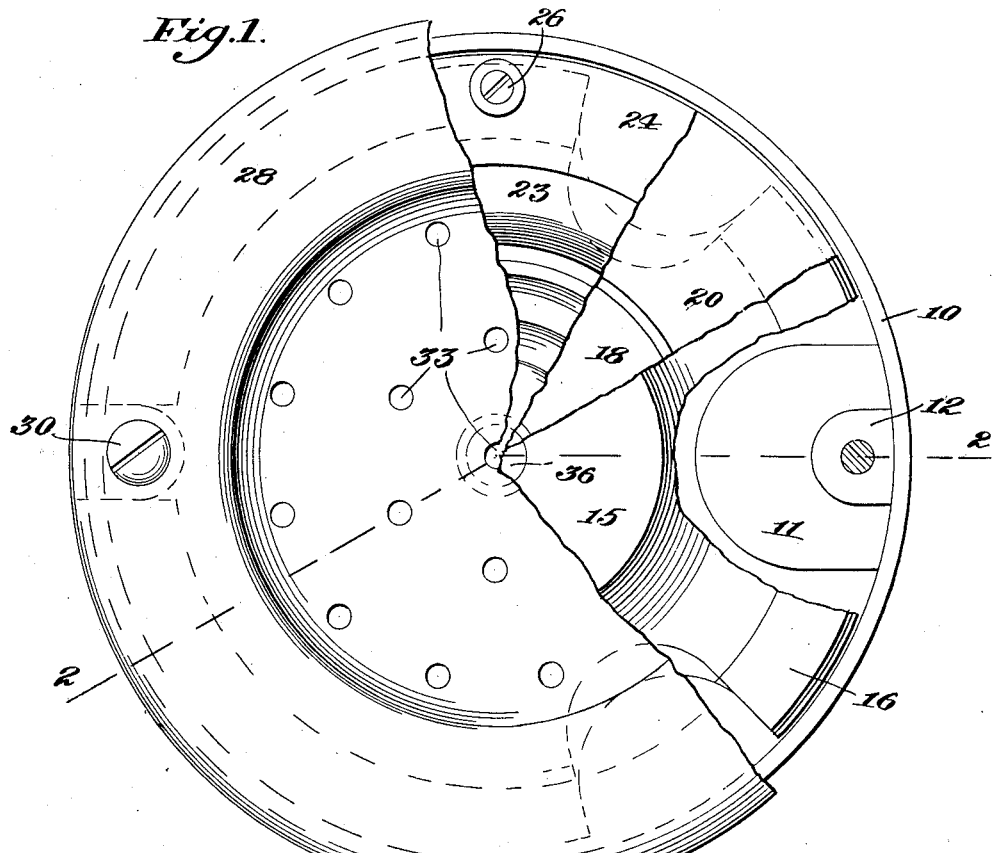

Oct. 12, 1937.                J. G. SPEER                2,095,373
                        SOUND TRANSLATING DEVICE
                          Filed Nov. 9, 1934

Inventor:
Joseph G. Speer,
by Karl Truning
his Attorney

Patented Oct. 12, 1937

2,095,373

UNITED STATES PATENT OFFICE 2,095,373

SOUND TRANSLATING DEVICE

Joseph G. Speer, New York, N. Y., assignor, by mesne assignments, to Bendix Radio Corporation, New York, N. Y., a corporation of Delaware Application November 9, 1934, Serial No. 752,359

6 Claims. (Cl. 179—115.5)

The invention relates particularly to electrodynamic sound translating devices which include a vibratory diaphragm associated with a cooperating magnetic structure. While not entirely confined thereto the invention may be applied to the telephone transmitters.

The invention is directed toward means for obtaining a uniform response over the useful frequency range of such devices of the moving coil or moving armature type. It is a purpose of the invention to cause the moving coil or moving armature to move with a velocity proportional to the pressure of the incident sound waves over the entire frequency range required of such devices. The restraint or damping imposed upon the free motion of the diaphragm carrying the current coil or armature is reduced to a low degree so that the velocity of motion of the diaphragm is largely controlled by the amount of air allowed to flow against its surface. Between the diaphragm and the impinging sound waves may be interposed a surface so perforated as to offer a large resistance to the free flow of air from the outer atmosphere to the diaphragm.

When applied to a moving coil transmitter where the diaphragm carries a current conducting coil pressure applied to the diaphragm will move the coil axially between the co-axial pole pieces of a magnet cutting the magnetic field and thus generate a voltage proportional to the velocity of the motion of the coil. As applied to a moving armature transmitter the diaphragm carries an armature of magnetic material adapted to move with the diaphragm and alter the reluctance of a magnet circuit carrying a magnetic flux supplied by a magnet wound with a conducting coil in which a voltage is developed proportional to the rate of change of the magnetic flux which in turn is proportional to the velocity of the motion of the armature carried by the diaphragm.

The transmitter is preferably used in a casing so that pressure variations in the outside air of sound frequencies are not imposed upon the back surface of the diaphragm. It is not necessary that the case be constructed absolutely air-tight since it is desirable to permit the pressure within the case to change with barometric changes in atmospheric pressure. The air leak to the inside of the casing should be so small as to permit only negligible variations in air pressure inside the case if the exterior pressure is changing at sound frequencies. The acoustic stiffness of the air inside the casing should be small compared with the stiffness of the diaphragm so as to not unduly limit the displacement of the diaphragm at the lower sound frequencies. The front surface of the diaphragm may be separated from the outside atmosphere by a plate which may be provided with passages having an acoustic resistance such that the velocity of the air flowing through the perforated plate is proportional to the pressure difference existing on the two sides of the plate. The acoustic resistance may be formed by small perforations or slots in the plate or by covering one side of the plate by a closely woven fabric of the proper texture. The volume of air enclosed between the diaphragm and the plate should be small and should have a high acoustic stiffness at the upper limit of the required frequency range so that the volumetric displacement of the diaphragm will substantially equal the volume of air admitted through the plate. This arrangement will result in diaphragm velocities proportional to the outside pressure independently of the frequency of these pressure changes. The degree in acoustic stiffness of the air in the space between the diaphragm and the plate may be compensated for by proportioning the size and shape of the perforations or openings in the plate so that a mass reactance to the flow of air is effected which may be resonated with the acoustic stiffness of the space between the diaphragm and plate at the upper frequency limit and thus minimize the attenuation of the higher frequencies.

It may be possible to so construct a moving armature microphone as to offer substantially no restraint to the free motion of the diaphragm other than the mass and stiffness of the diaphragm and the stiffness of the enclosed air. Special treatment is usually required, however, to minimize the restraint imposed on the diaphragm of a moving coil type of microphone. The magnetic gap between the pole pieces in which the coil is positioned is necessarily of small dimensions so as to assure an efficient magnetic structure. The air trapped under the diaphragm and between it and the pole pieces must ordinarily be forced through this gap as the diaphragm moves. The impedance of this gap to the air flow is appreciable at some frequencies. At the higher frequencies this impedance is largely mass reactance and in some microphones is equal to the acoustic stiffness of the air trapped under the diaphragm at approximately 3,000 cycles. At this point of anti-resonance a very large restraint may thus be imposed upon the motion of the diaphragm with a resulting reduction of response at frequencies in that range.

Below the diaphragm a cylindrical cavity may be introduced into the center pole piece and magnet of such a length as to resonate in itself as a tube closed at one end at a frequency appreciably lower than the anti-resonant frequency indicated. At frequencies below resonance the cylindrical cavity will act as an acoustic stiffness with but little effect as it is effectively shunted by the resistance of the magnetic air gap in which is positioned the coil. At frequencies above resonance, however, such a cavity will approach a pure acoustic resistance in nature and effectively shunts the anti-resonant air gap and air space thus reducing the restraint imposed upon the diaphragm to a nominal amount at all frequencies.

Figure 2:
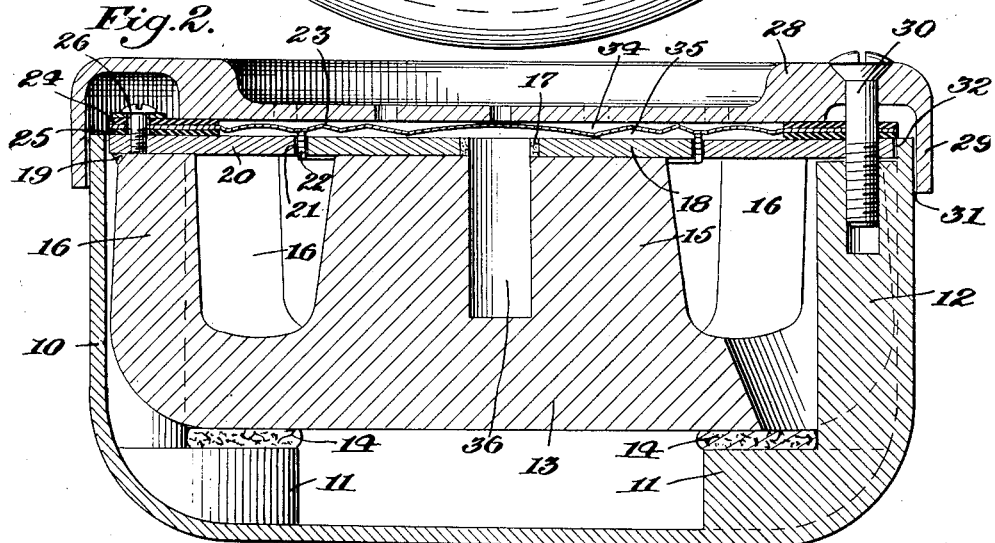

In the accompanying drawing illustrating one embodiment of the invention, Figure 1 is a plan view of a microphone, parts being broken away to show the underlying structure, and Fig. 2 is a transverse section on the line 2—2 of Figure 1.

The casing 10 is generally circular and hollow in formation. At suitable points toward its bottom it is provided with seats 11 and at suitable points there are upwardly extending enlargements or columns 12. Resting on the seats 11 is the magnet 13 which may be supported by resilient cushions 14 made of cork or other suitable material. The magnet 13 may comprise a central core or pole piece 15 and a suitable number of upwardly extending pole pieces 16 surrounding it. For convenience the central pole piece 15 may be referred to as north pole and the surrounding poles likewise may be referred to as south poles. Fastened by some such means as the weld 17 to the pole 15 is shown a substantially circular pole piece 18 which at its outer edge is shown as extending somewhat beyond the central pole piece 15. Likewise fastened to the poles 16 by some such means as the welding 19 is an annular pole piece 20 which extends inwardly toward the pole piece 18 leaving a narrow air gap 21 between pole pieces 18 and 20. Extending into or through and nearly filling the narrow gap 21 is a coil 22 carried by a diaphragm 23.

The diaphragm 23 may be generally circular in form and is supported at about its circumference by a pair of annular washers 24 and 25 respectively above and below the diaphragm 23. These washers will preferably be of some insulating material such as bakelite or the like. Screws 26 tapped into the pole piece 20 at suitable points hold the edge of the diaphragm 23 rigidly between the annular washers 24 and 25 and somewhat out of contact with the pole pieces 18 and 20. Resting upon the outer washer 24 is a cover plate 28 extending downwardly at 29 about the edge of the casing 10. The cover plate 28 may be held in position more or less tightly against the washer 24 by means of screws 30 tapped into the upwardly extending enlargements or columns 12 of the casing 10. It will be seen that the cover plate 28 tends to hold the entire device including the magnet 13 into the casing 10 and against the cushions 14. The cushions 14 are not essential but they may be desirable as they tend to absorb shocks and relieve strains on the welds and other parts of the apparatus.

It will be noted that between the annular depending cover extension 29 and the casing 10 a slight sace 31 is left. It will also be noted that between the upper edge of the casing 10 and the outer edge of the pole piece 20 a slight space 32 is left. This provides a narrow channel connecting the interior of the casing with the exterior of the casing so that ordinary atmospheric or barometric changes without the casing may affect, and be equalized in, the air within the casing. The channels 31 and 32, however, are preferably so narrow and circuitous that rapid changes in the external atmospheric pressure while sound waves are being received will not be transmitted to the air within the casing.

The exact form of the diaphragm 23 forms no part of the present invention. It may be made of such material as aluminum alloy and preferably will be corrugated as illustrated so as to be relatively stiff in the center but flexible at and toward the periphery so as to allow axial motion.

The central portion of the cap or cover 28 contains a suitable number of perforations 33 immediately over the diaphragm and to the under surface of the cap may be cemented a piece of closely woven fabric (not shown). The arrangement and proportions will preferably be such that the texture of the fabric in combination with the perforations 33, or the perforations alone, may offer an impedance to the flow of air through the cap so that the volume of air passed per unit of pressure in a unit of time may be approximately equal to the volume displaced by the diaphragm at the frequencies where its normal restraint is greatest when the front surface of the diaphragm is acted upon by the same air pressure for the same time unit. It will be understood that the normal restraint on the motion of the diaphragm is caused by the stiffness of the diaphragm and the mass of the diaphragm and coil and this restraint is greatest at the upper and lower limits of the frequency range for which the instrument is adapted.

For the greater portion of the frequency range the volume displacement of the diaphragm will closely approach the volume of air passing through the perforations 33. At the high frequencies, however, the stiffness of the air contained in the space 34 between the diaphragm 23 and the cover 28 may decrease to a value not greater than the mass reactance of the moving coil and diaphragm. At these and higher frequencies a considerable portion of the air passing through the perforations 33 will be utilized in increasing the pressure in the enclosed space 34 rather than in moving the diaphragm. This may result in a reduction in response of the diaphragm at these frequencies. In order to eliminate or minimize this reduction the perforations 33 are so shaped and sized as to provide air columns having the proper mass reactance to resonate with the stiffness of the enclosed space 34 at and toward the upper limit of frequency in response to which the microphone may be designed.

When the diaphragm 23 vibrates the air trapped in the space 35 between the diaphragm and the pole pieces 18 and 20 must pass through the narrow space 21 surrounding the coil 22 in the magnetic gap between the pole pieces 18 and 20. While the impedance of this passage 21 to the air flow is small at most frequencies it is largely mass reactance and will resonate with the stiffness of the air in the chamber 35 at some frequencies. In one construction the frequency at which this resonance occurs was approximately 3,000 cycles. At and near this frequency of resonance the restraint imposed by the air in the space 35 upon the motion of the diaphragm 23 may be very large and consequently the response of the diaphragm 23 may be greatly reduced. In order to overcome or eliminate this restraint a cylindrical cavity 36 may be provided back of the diaphragm for instance in the central pole 15 and the surmounting pole piece 18. The cavity 36 does not pass through the pole 15 but is closed at one end, being open at the end toward the diaphragm 23 and communicating with the enclosed space 35. The cylindrical cavity 36 is so proportioned and arranged that it resonates as a closed tube at a frequency somewhat lower than the frequency of the restraining anti-resonate condition which in the specific instance referred to above is approximately 3,000 cycles. At frequencies below its natural resonance the cylindrical cavity 36 will act as an acoustic stiffness but at frequencies above resonance it will approach an acoustic non-reactive resistance in nature the magnitude of which will be inversely proportional to the square of its cross sectional area. It will be understood, therefore, that this area must be sufficiently great to effectively shunt the impedance offered to the flow of air by the passage 21 and the enclosed space 35 at their frequency of resonance.

The air trapped or held under the diaphragm in the enclosed space 35 in normal operation flows through the passage 21 into and out of the chamber formed by the casing 10. The chamber formed by the casing 10 must be of sufficient volume to introduce a negligible acoustic stiffness. The case 10 normally completely shields the underside of the diaphragm 23 from pressure changes of sound frequency in the outside atmosphere. As indicated above, however, it is desirable that there be a small air leak between the inside of the case 10 and the outside atmosphere for the purpose of compensating for changes in the barometric pressure of the atmosphere. As already described this air leak may be provided by the small passages 31 and 32 existing in an ordinary mechanical fit between the casing 10 and the depending rim 29 of the cover 28.

The electrical wiring connections of such microphones are not described as they and other details of construction and operation are well known to those versed in the art.

One form the invention may take has been illustrated and described in detail but it will be understood that various changes may be made in shapes, sizes, proportions, materials, arrangements and other details to produce devices embodying the invention.

I claim as my invention:

1. An electrodynamic sound translating device comprising a central pole piece and an annular pole piece surrounding the central pole piece forming an air gap between them, a diaphragm supported out of contact with the pole pieces, a coil on the diaphragm in the air gap, a protecting cover plate on one side of the diaphragm provided with perforations providing an acoustic resistance such that the velocity of the air flowing through the plate is proportional to the pressure difference on the two sides of the plate, said central pole piece having a cavity open toward the diaphragm and forming a closed tube resonating at a frequency appreciably lower than the antiresonant frequency of the air trapped between the diaphragm and the pole piece.

2. An electrodynamic sound translating device comprising a central pole piece and an annular pole piece surrounding the central pole piece forming an air gap between them, a diaphragm supported out of contact with the pole pieces, a coil on the diaphragm in the air gap, a protecting cover plate on one side of the diaphragm provided with perforations providing an acoustic resistance providing a mass reactance to the flow of air which is resonated with the acoustic stiffness at the upper frequency limit, said central pole piece having a cavity open toward the diaphragm and forming a closed tube resonating at a frequency appreciably lower than the antiresonant frequency of the air trapped between the diaphragm and the pole piece.

3. An electrodynamic sound translating device comprising a central pole piece and an annular pole piece surrounding the central pole piece forming an air gap between them, a diaphragm supported out of contact with the pole pieces, a coil on the diaphragm in the air gap, said central pole piece having a cavity open toward the diaphragm and forming a closed tube resonating at a frequency appreciably lower than the antiresonant frequency of the air trapped between the diaphragm and the pole piece.

4. A sound transmitting device comprising a vibratory diaphragm carrying a coil, a magnetic device having an air gap between its poles in which is the coil and through which air may pass from the chamber between the magnetic device and the diaphragm in normal operation so arranged that at certain frequencies the impedance of the air gap is largely mass reactance and a closed end tube in one pole which at such frequencies acts as acoustic resistance effectively shunting the air gap.

5. A sound transmitting device comprising a vibratory diaphragm carrying a coil, a magnetic device having an air gap between its poles in which is the coil and through which air may pass from the chamber between the magnetic device and the diaphragm, a tube, the side of the diaphragm toward the magnetic device being adjacent to the open end of the tube, said tube closed at the other end and of such size as to acoustically resonate at a frequency lower than the antiresonant frequency of the enclosed space formed on the same side of the diaphragm in combination with the air gap.

6. A sound transmitting device comprising a vibratory diaphragm, a magnetic translating means associated with the diaphragm and a body of air behind the diaphragm, a tube, one side of the diaphragm being adjacent the open end of the tube, said tube closed at the other end and of such size as to acoustically resonate at a frequency lower than the antiresonant frequency of the body of air.

JOSEPH G. SPEER.